United States Patent [19]

Weyman

[11] Patent Number: 5,113,715
[45] Date of Patent: May 19, 1992

[54] GEAR CHANGE MECHANISM

[75] Inventor: Roger M. Weyman, Coventry, United Kingdom

[73] Assignee: Massey-Ferguson Services N.V., Netherlands Antilles

[21] Appl. No.: 584,927

[22] Filed: Sep. 19, 1990

[30] Foreign Application Priority Data

Sep. 23, 1989 [GB] United Kingdom ............... 8921541

[51] Int. Cl.$^5$ ..................... B60K 20/00; F16D 11/00
[52] U.S. Cl. ............................. 74/473 R; 192/82 R
[58] Field of Search ................. 74/473 R; 192/82 R

[56] References Cited

U.S. PATENT DOCUMENTS

| | | | |
|---|---|---|---|
| 1,413,058 | 4/1922 | Richardson | 74/473 X |
| 2,105,485 | 1/1938 | Larson | 74/473 X |
| 2,535,381 | 12/1950 | Andrews | 74/473 R |
| 4,299,134 | 11/1981 | Roy et al. | 74/473 R |
| 4,335,623 | 6/1982 | Kronstadt | 74/477 |
| 4,509,385 | 4/1985 | Inui et al. | 74/477 |

FOREIGN PATENT DOCUMENTS

| | | |
|---|---|---|
| 0377795 | 7/1990 | European Pat. Off. . |
| 3827571 | 3/1990 | Fed. Rep. of Germany . |
| 1122274 | 7/1968 | United Kingdom . |

Primary Examiner—Allan D. Herrmann
Assistant Examiner—David W. Laub
Attorney, Agent, or Firm—MacMillan, Sobanski & Todd

[57] ABSTRACT

Gearbox selector forks are commonly mounted for axial movement on a supporting rail which is rigidly mounted in the gearbox casing. When the fork is moved axially along the rail to move a coupling sleeve it can tilt and jam on the rail if it experiences excessive actuation loads which may inhibit or at least delay the operation of the associated synchromesh unit and engagement of the required gear. The present invention overcomes this problem by providing a support rail 14 which is itself axially displaceable against the action of a resilient means 32 thereby ensuring that the required selector fork 16 movement for gear engagement may be achieved even when the fork 16 is jammed on the support rail 14.

6 Claims, 2 Drawing Sheets

GEAR CHANGE MECHANISM

BACKGROUND OF THE INVENTION

This invention relates to gear-change mechanisms for a vehicular transmissions and, more particularly, to shift forks and fork rails utilized therein.

Gear box selector forks are commonly mounted for axial movement on a supporting rail which is rigidly mounted at either end in the gearbox casing. The selector fork is conventionally slid along the rail to move a coupling sleeve and thereby couple a gear or gears to an associated shaft via an associated synchromesh unit.

When the selector fork is moved axially along the rail the loads experienced by the fork tend to tilt the fork on the rail and cause the fork to jam. This may inhibit or at least delay the operation of the associated synchromesh unit and engagement of the required gear.

SUMMARY OF THE INVENTION

It is an object of the present invention to provide a gear change mechanism for vehicular transmission which ensures that operation of the associated synchromesh unit and engagement of the required gear is not prevented by jamming of the associated selector fork on its supporting rail.

Accordingly, the present invention provides a gear change mechanism for an automotive vehicular transmission having one or more gear trains established through an associated selector fork slidably mounted on a support rail, in which the support rail may be displaced axially against the action of a resilient means to ensure that the required selector fork movement for gear engagement may be achieved even when the fork is jammed on the support shaft.

Preferably, the resilient means comprises a pair of leaf spring members provided at either end of the support shaft and connected thereto and to a portion of the gearbox casing by means of bolts or the like so that the spring members not only control axial displacement of the support rail but also support the rail from the casing. The ends of the support shaft may pass with clearance through holes provided in the gearbox casing before they are connected to the spring members.

In an alternative arrangement, the resilient retaining means may comprise a pair of compression coil springs provided one between each end of the support rail and an adjacent portion of the gearbox casing. In this arrangement, the support rail is preferably mounted at either end for axial movement within low friction bushes provided in recesses formed in the gearbox casing.

In a still further arrangement, the resilient means comprises just one leaf spring member provided at one end of the support rail which is connected thereto and to a portion of the gearbox casing by means of bolts. It will be appreciated that if this arrangement was employed the other end of the shaft should be supported within a low friction bush which accommodates axial movement.

BRIEF DESCRIPTION OF THE DRAWINGS

The present invention will now be more particularly described, by way of example only, with reference to the accompanying drawings in which.

DESCRIPTION OF THE PREFERRED EMBODIMENT

Figure 1:
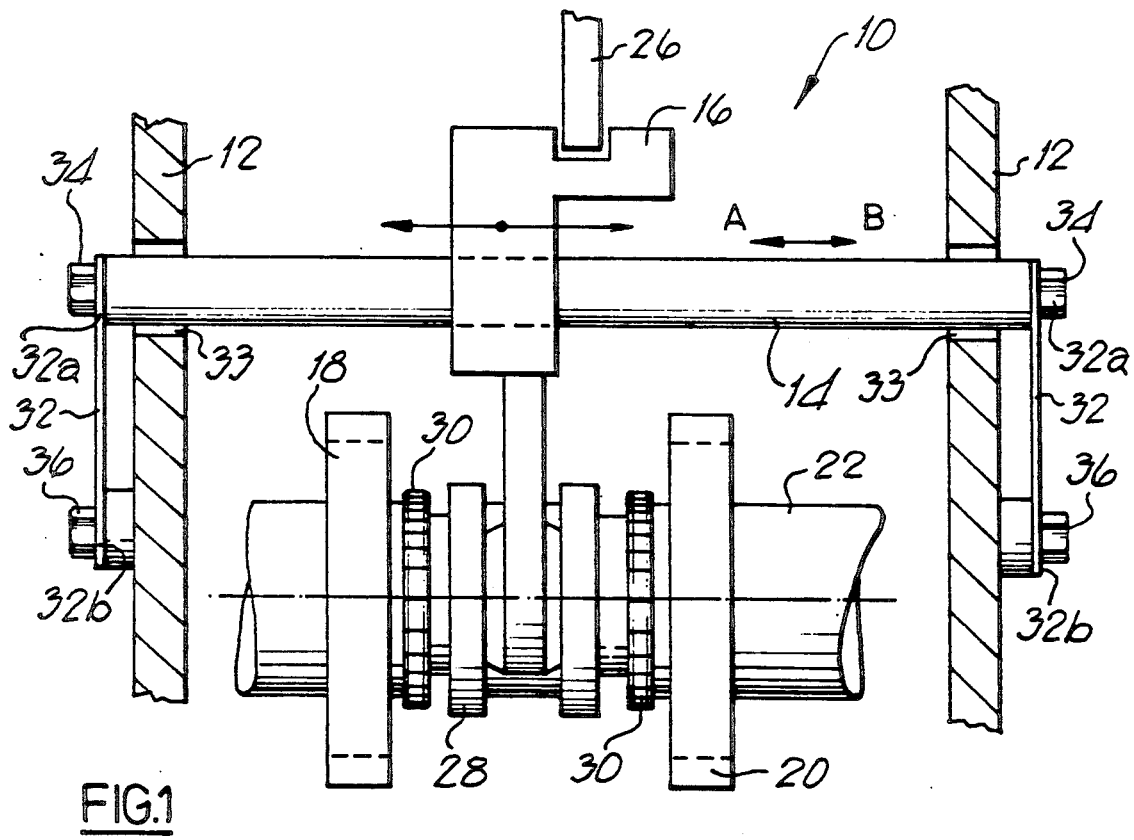
FIG. 1 is a diagramatic representation of a portion of a gearbox incorporating a selector fork and support rail arranged in accordance with the present invention.

In FIG. 1 there is shown a support rail arrangement indicated generally at P, in which a support rail 14 is mounted by means of a pair of resilient members in the form of leaf springs 32 provided at each end of the rail 14 which allow a small degree of axial displacement of the rail 14 in the direction of the double-headed arrow A-B during gear engagement. The leaf springs 32 are preferably made from spring steel and are connected at a first end 32a to the end of the rail 14 by means of bolts 34 and at a second end 32b to a fixed portion of the gearbox casing 12 by bolts 36.

During gear selection, an actuator finger 26 is used to axially move the selector fork 16 in the direction of the double-headed arrow C-D along the support rail 14 in the conventional manner in order to move the coupling sleeve 28 and thereby couple either of the gears 18, 20 to the shaft 22 via synchromesh unit 30. If the selector fork 16 experiences excessive actuation loads, at or before the point of gear engagement, and the selector fork 16 jams on the rail 14 then the leaf springs 32 bend allowing the support rail 14 to move axially by a comparatively small amount thereby to transfer the actuation load and ensure that the fork 16 can complete its travel and fully engage the required gear 18, 20 via the synchromesh unit 30. Typically the selector fork 16 will travel 10 mm between its neutral position and the position in which the gear is fully engaged, whilst the rail 14 will travel 1 mm or less to complete the movement of the selector fork 16 if it is jammed on the rail 14. Once the required gear has been engaged, the actuation load experienced by the selector fork 16 reduces and the selector fork 16 is unjammed from the rail 14 and the springs 32 act to re-centralize the support rail 14 by sliding it through the selector fork 16. It has been found that the leaf springs 32 allow the selector fork 16 to "float" and find a final equilibrium position when engaged thereby minimizing any loads carried therethrough. Disengagement of any selected gear 18, 20 is obviously the reverse of the engagement procedure, however, since actuation loads are reduced there is little or no possibility of the selector fork 16 jamming on the support rail 14. In the arrangement shown, the leaf springs 32 are positioned on the outside of the gearbox casing 12 and the support rail 14 passes through holes 33 provided in the casing with sufficient clearance to eliminate friction therebetween.

Figure 2:
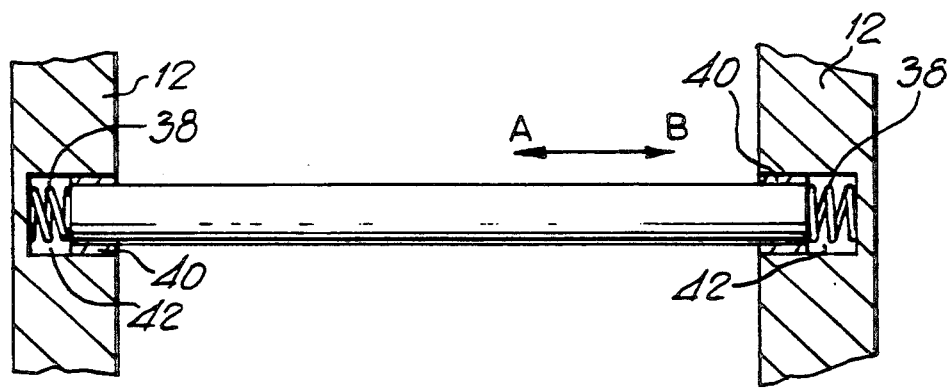
FIG. 2 is a partial view of a gearbox incorporating a second form of support rail in accordance with the present invention.

In an alternative arrangement, shown in FIG. 2, the resilient means comprises a pair of compression coil springs 38 provided between each end of the support rail 14 and an adjacent portion of the gearbox casing 12. The support rail 14 is preferably mounted at either end for axial movement within low friction bushes 40 provided in recesses 42 positioned in the gearbox casing 12 and the coil springs 38 are positioned in said recesses 42 between the ends of the support rail 14 and their respective portions of the casing 12. Axial displacement of the rail 14 is accommodated by the springs which also act to restore the rail 14 to its equilibrium position when the actuation load reduces. This arrangement whilst providing an adequate alternative to the preferred embodiment suffers from the effects of friction between the rail ends 14 and the bushes 40 which reduces its effectiveness.

Figure 3:
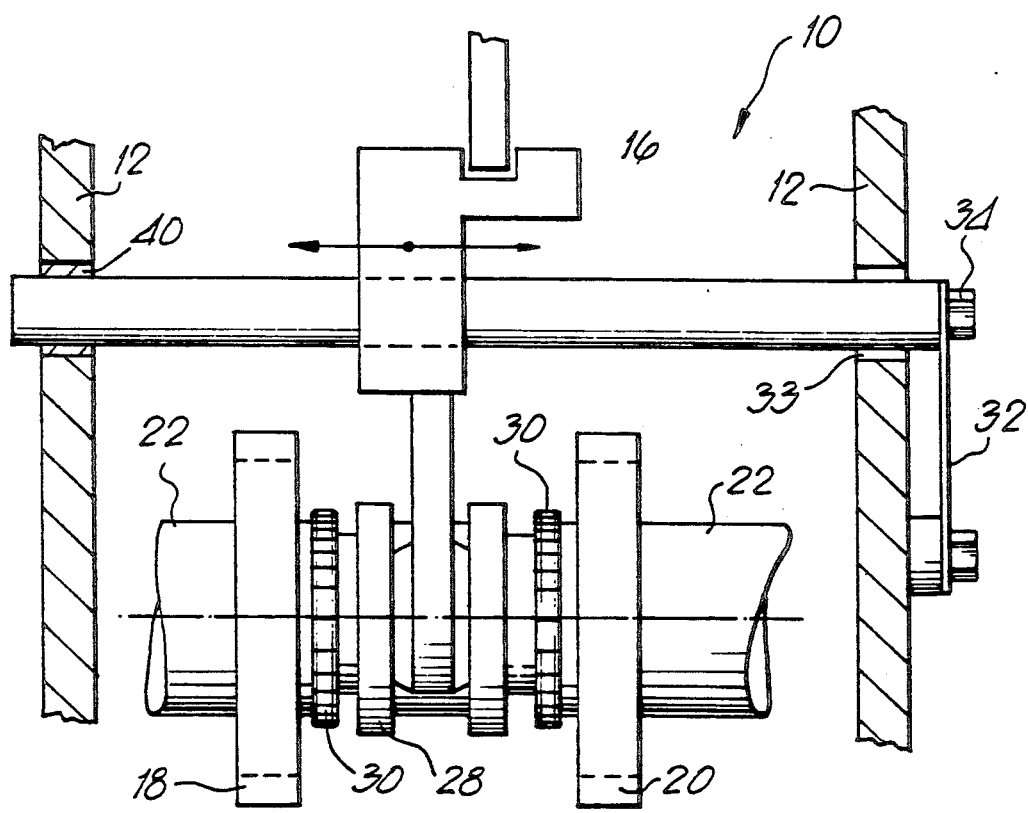
FIG. 3 is a diagramatic representation of a portion of the gearbox incorporating a still further form of support rail in accordance with the present invention.

In a still further arrangement 10, shown in FIG. 3, the resilient means comprises just one leaf spring 32 provided at one end of the support rail 14 which is connected to the gearbox casing 12 in the same manner as already described and therefore not repeated. The otherwise free end of the support rail 14 is slidably engaged in a low friction bush 40 provided in a recess 42 in the gearbox casing 12. This arrangement whilst partially overcoming the frictional problems associated with the second alternative, in which two bushes 40 are used, is still unable to eliminate completely operational friction and therefore remains a compromise.

It will be appreciated that whilst the resilient retaining means have been described with reference to leaf spring 32 and coil springs 38 other forms of retaining means may be used, such as for example tension springs resilient rubber blocks or belleville spring rings. It is not intended therefore to limit the scope of the present invention to the use of the resilient retaining means disclosed.

I claim:

1. A gear change mechanism for a vehicular transmission comprising:
    a gearbox casing;
    a support rail having two ends;
    means for resiliently supporting said support rail on said gearbox casing for limited axial movement;
    gear changing means disposed within said gearbox casing; and
    a selector fork connected to said gear changing means and slidably mounted on said support rail for axial movement to operate said gear changing means.

2. A gear change mechanism as claimed in claim 1 in which the resilient means comprises a pair of leaf springs, one spring being provided at each end of the support rail, each spring having a first end connected to the rail for movement therewith and a second end connected to a portion of said gearbox casing.

3. A gear change mechanism as claimed in claim 1 in which each end of the rail passes with clearance through means defining a hole in said gearbox casing before being connected to the resilient means.

4. A gear change mechanism as claimed in claim 1 in which the resilient means comprises a pair of compression coil springs, one spring being provided at each end of the support rail, each spring being positioned between its associated rail end and a portion of said gearbox casing.

5. A gear change mechanism as claimed in claim 1 in which the rail is mounted at both ends in bushes made from low friction material and positioned in recesses formed in said gearbox casing.

6. A gear change mechanism as claimed in claim 1 in which the resilient means comprises a single leaf spring provided at one end of the support rail, said spring being connected at a first end to the rail for movement therewith and at a second end to a proton of said gearbox casing and in which an otherwise free end of the rail is slidably mounted in a low friction bush provided in said gearbox casing.

* * * * *